O. N. TEVANDER.
MASSAGING IMPLEMENT.
APPLICATION FILED OCT. 5, 1908.
915,315.
Patented Mar. 16, 1909.
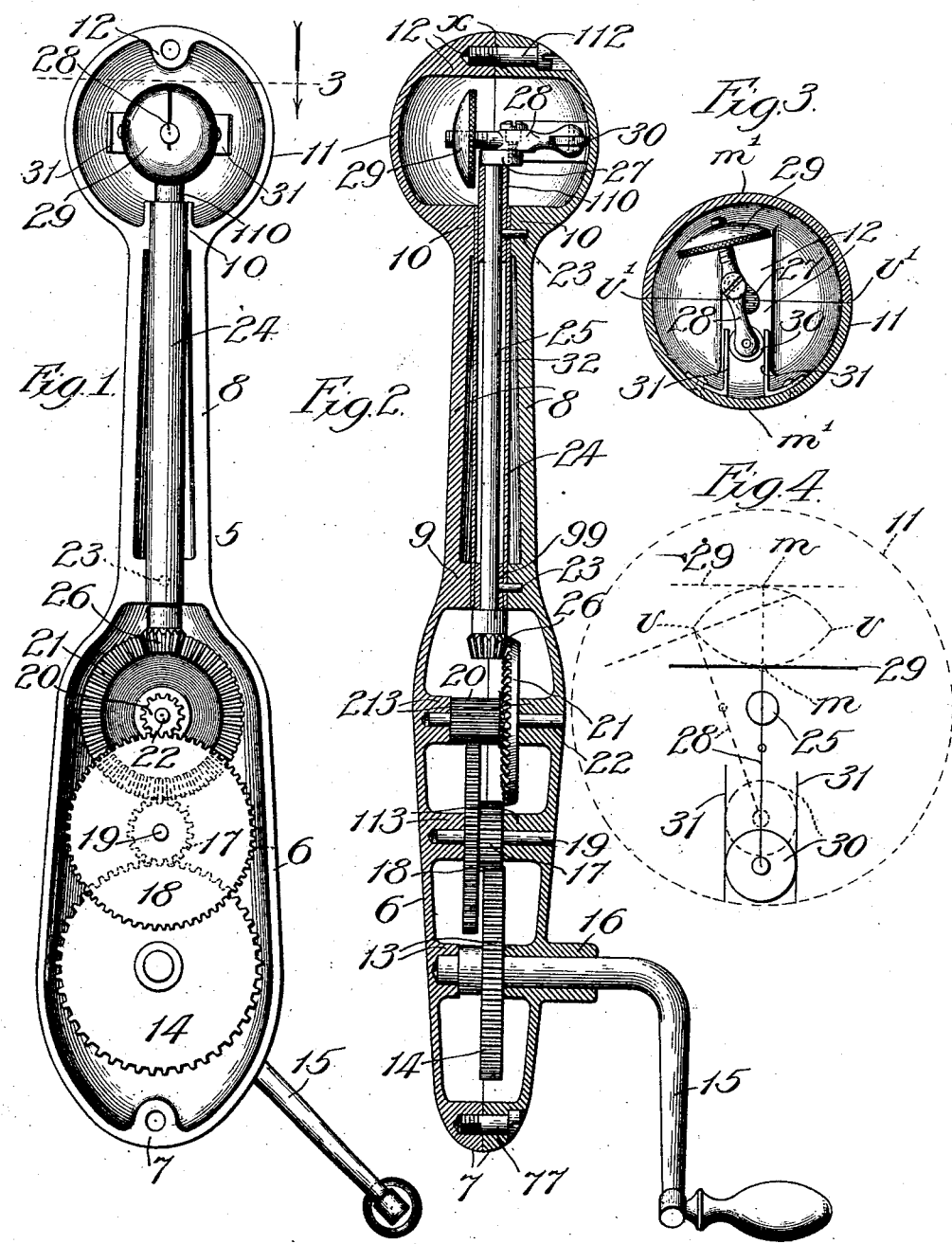
Witnesses:
John Endire
Chas H. Buell
Inventor.
Olof N. Tevander.
By Dyrenforth, Lee, Chritton & Wiles
Attys.

UNITED STATES PATENT OFFICE.

OLOF N. TEVANDER, OF CHICAGO, ILLINOIS, ASSIGNOR TO ARTHUR H. APFEL, OF CHICAGO, ILLINOIS.

MASSAGING IMPLEMENT.

No. 915,315.  Specification of Letters Patent.  Patented March 16, 1909.

Application filed October 5, 1908. Serial No. 456,189.

*To all whom it may concern:*

Be it known that I, OLOF N. TEVANDER, a citizen of the United States, residing at Chicago, in the county of Cook and State of Illinois, have invented a new and useful Improvement in Massaging Implements, of which the following is a specification.

My invention relates to an improvement in the class of massaging implements or vibrators in which the vibratory impulses are produced in the substance of the casing of the implement by actuating a body supported by the casing to produce them therein for transmission to the surface to which the casing is applied for the massaging treatment, usually through the medium of a so-called applicator on the casing.

In the accompanying drawing, Figure 1 is a view of my improved device in rear elevation with the back-section of the preferably two-part casing removed to present its contained mechanism; Fig. 2 is a longitudinal section taken through the entire casing and part of its contained mechanism at a right-angle to the view presented in Fig. 1; Fig. 3 is a section on line 3 Fig. 1, and Fig. 4 is a diagram illustrating the action of the crank-driven body on the head of the casing in producing the vibratory impulses in its transmission therefrom.

The preferred construction of the casing 5, though it may be variously modified without departure from my invention, is that shown, involving two similar back and front interfitting sections, each comprising an expanded handle-portion 6 slightly tapering, as represented, with a thickened rear extremity 7 through which to fasten the sections together at that end, as by a countersunk screw 77, a neck-portion 8 formed at its base with an inwardly-extending bearing-lug 9 and with a bearing 10 at its opposite end which terminates in a semi-globular hollow head 11 having its forward end internally thickened at 12 where the sections of the casing are fastened together, as by a countersunk screw 112. Bearing-lugs 13, 113 and 213 project inwardly and coincidently at suitable intervals apart from the opposite inner walls of the handle-portions of the casing-sections for supporting therein a train of gears. The train is shown as involving a driving-gear 14 on an operating crank-handle 15 journaled in the bearings 13 and in a boss 16 coincident therewith on a casing-section, this gear meshing with a pinion 17 on and concentric with a smaller gear-wheel 18, both journaled to work between the bearings 113 on a pin 19 extending from one to the other, and the gear 18 meshing with a pinion 20 on and concentric with a still smaller beveled-gear 21 journaled to work between the bearings 213 on a pin 22 extending from one to the other. Similar studs 23 protrude into the bearings 9 and 10 of one casing-section 8 for the purpose hereinafter explained.

A sleeve 24 extends through the two bearings 9 and 10 and has fastened in its opposite ends tubular bearings 99 and 110, through transverse openings in which and in the sleeve 24 the studs 23 extend for securing the sleeve against rotation. In the bushings is journaled a shaft 25 carrying on one end a beveled pinion 26 meshing with the gear 21 and on its opposite end, which projects into the globular casing-head, a crank 27. The wrist-pin of this crank passes transversely through a stem 28 for journaling it thereon, this stem being threaded toward one end where it has screwed upon it a head 29, shown of convexly-faced button-form radially split to adapt it to clamp itself resiliently about the threaded portion of the stem for holding it in any position thereon to which it may be adjusted for setting it to vary the force of its action hereinafter described. This stem carries in its opposite, bifurcated, end an anti-friction roller 30 to work in a guide-way formed by two parallel guides 31 projecting into the globular casing-head from its inner wall to extend at right-angles to the axis of rotation of the shaft 25.

The space 32 in the sleeve 24 about the shaft 25 affords a chamber for lubricant, preferably in solid form.

By holding the casing at its handle-portion in one hand and turning with the other the crank-handle 15 to drive the train of gears for rapidly rotating the shaft 25, the action of the crank 27 upon the stem 28 reciprocates the roller 30 in its guide-way, as indicated in Fig. 4, and in so doing, to reciprocate the stem, oscillates the latter to cause the weight to describe, in the direction of the arrows in that figure, the ellipsoidal path defined by dotted representation in the diagram. In describing this path the weight vibrates the casing-head 11, the more violent impulses occurring at the extremities of the ellipse, at the points $v$—$v$, while at the points $m$—$m$ of the path midway between the first-named points, as also at a point coincident with the forward end of the head 11, they are much milder. These impulses of the body 29 in the head 11 vibrate the substance of the latter with jarring force, most violently at the points $v^1$, $v^1$ thereon (Fig. 3) and with relative mildness by a gliding force at the points $m^1$—$m^1$ thereon, as also at the point $x$ or forward part of the hollow head. Thus the vibrations at the points $v^1$ differ from those at the points $m^1$ and $x$ not only in degree but also in character. These vibrations may be transmitted to the surfaces to be treated through the medium of different forms of applicators such as are commonly used on vibrators, suitable for contacting them with different parts of the body, as the face, the trunk and the extremities, and the head 11 may be adapted for affixing to it such applicators at desired points. However, the form of this head renders it, itself, a suitable applicator, adapting it to be applied at either point $v^1$ for the more violent vibratory action, and at a point $m^1$ or $x$ for transmitting to the surface of application the milder vibrations, thereby rendering the head a multiple applicator in itself. By turning the body 29 on the thread-portion of the stem 28 to set it toward or from the extremity thereof, the force of the impulses may be augmented or decreased, according to desire or requirement.

It is to be understood that the gist of my invention lies in the peculiar action of the crank-actuated body 29 in traversing the ellipsoidal path, as described, to vibrate the casing without impact-contact with any portion thereof, and this whatever may be the shape or construction of the casing and the relation thereto of the exciting body, and whatever may be the character of means employed for actuating it.

It will be observed that the vibration-exciting body 29 is far removed from the handle-portion, being at the extreme end of the implement. The advantage of this construction is important in reducing to the minimum the vibrations in the hand of the operator, where they are not desirable.

What I claim as new and desire to secure by Letters Patent is—

1. In a massaging-implement, the combination of a casing, means for inducing vibrations in the material of the casing for transmission therefrom to a surface to be massaged, said means comprising a weight reciprocably supported on the casing to adapt it to describe an ellipsoidal path, and means for reciprocating said weight through such path and maintaining it, throughout its movement, out of contact with the casing, for the purpose set forth.

2. In a massaging-implement, the combination of a casing, means for inducing vibrations in the material of the casing for transmission therefrom to a surface to be massaged, said means comprising a weight adjustably and reciprocably supported on the casing to adapt it to describe an ellipsoidal path, and means for reciprocating said weight through such path and maintaining it, throughout its movement, out of contact with the casing, for the purpose set forth.

3. In a massaging-implement, the combination of a casing, a train of gears in the casing provided with means for actuating it, a shaft journaled in the casing and geared to said train, a crank on the shaft, a stem pivotally connected between its ends with the crank and guidingly confined at one end to permit it to be reciprocated, and a weight on the opposite end of the stem, for the purpose set forth.

4. In a massaging-implement, the combination of a casing, a train of gears in the casing provided with means for actuating it, a shaft journaled in the casing and geared to said train, a crank on the shaft, a stem pivotally connected between its ends with the crank and guidingly confined at one end to permit it to be reciprocated, and a weight adjustably secured on the opposite end of the stem, for the purpose set forth.

5. In a massaging-implement, the combination of a casing terminating at one end in a hollow head, means for inducing vibrations in the material of said head for transmission therefrom to a surface to be massaged, said means comprising a weight reciprocably supported in said head to adapt it to describe therein an ellipsoidal path, and means for reciprocating said weight through said path and maintaining it, throughout its movement, out of contact with said head, for the purpose set forth.

6. In a massaging-implement, the combination of a casing terminating at one end in a hollow globular head, a stem in said head guidingly confined therein at one end to be reciprocated, a weight in said head on the opposite end of the stem, a rotary shaft having a crank-connection with said stem between its ends, and means for rotating said shaft.

7. A massaging-implement comprising, in combination, a casing formed with a handle-portion having a neck-portion extending from it and a hollow head on the end of the neck-portion, a train of gears in said handle-portion and means for actuating it, a shaft journaled to extend in said neck-portion and geared at one end to said train, a crank on the opposite end of the shaft, a guide-way in said 5 head, a stem in said head connected between its ends with the crank, an anti-friction roller on one end of the stem working in said guide- way, and a weight on the opposite end of the stem, for the purpose set forth.

OLOF N. TEVANDER.

In presence of—
  J. G. ANDERSON,
  R. A. SCHAEFER.